(Model.)
J. C. DUPEE & C. P. HOUSUM.
REEL FOR CHECK ROW CORN PLANTERS.
No. 298,678. Patented May 13, 1884.
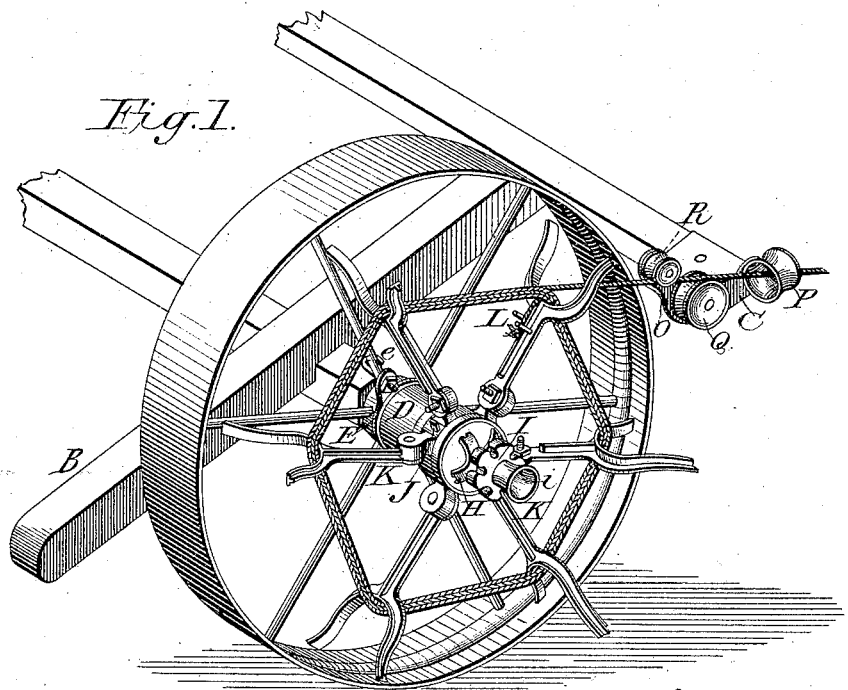
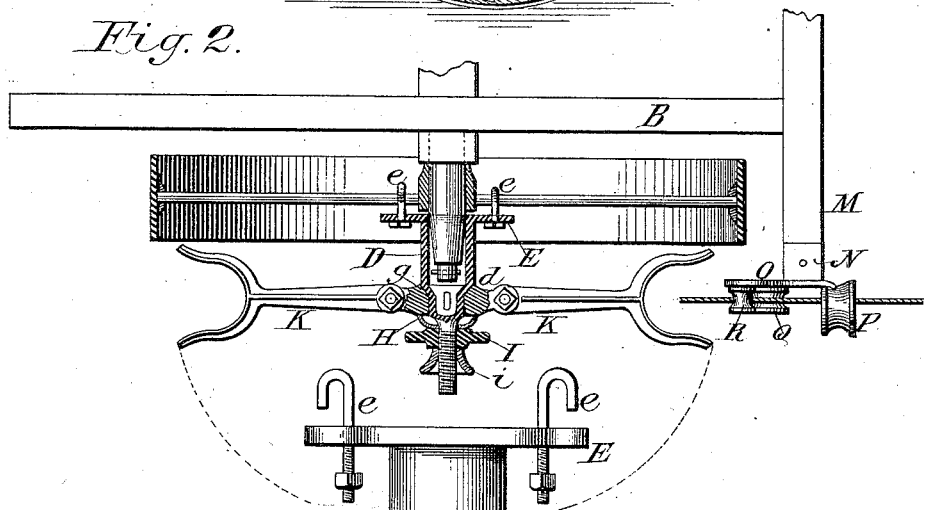
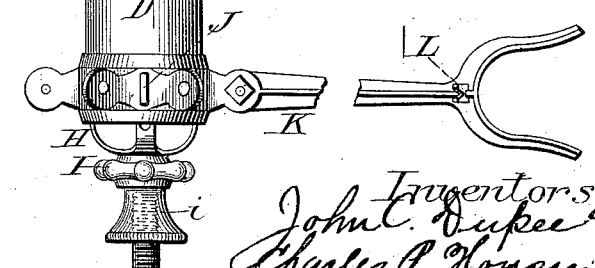
Witnesses:
John B. Bixby
Wm. B. Fuller
Inventors:
John C. Dupee
Charles P. Housum
By H. B. Richards
Atty.
N. PETERS, Photo-Lithographer, Washington, D. C.

United States Patent Office.

JOHN C. DUPEE AND CHARLES P. HOUSUM, OF DECATUR, ASSIGNORS TO LEWIS E. WATERMAN, OF MASON CITY, ILLINOIS.

REEL FOR CHECK-ROW CORN-PLANTERS.

SPECIFICATION forming part of Letters Patent No. 298,678, dated May 13, 1884.

Application filed December 1, 1880. Renewed March 2, 1883. (Model.)

*To all whom it may concern:*

Be it known that we, JOHN C. DUPEE and CHARLES P. HOUSUM, citizens of the United States, residing at Decatur, in the county of Macon and State of Illinois, have invented certain new and useful Improvements in Reels for Check-Row Corn-Planters; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to means for laying out and taking up the check-row wire or cord which is used while stretched across the field for actuating the planter seed-slides; and the invention consists in constructions and combinations hereinafter described and claimed.

In the accompanying drawings, which illustrate our invention, Figure 1 is a perspective of part of the rear frame of a planter with our reel mounted thereon. Fig. 2 is a horizontal sectional plan of the planter-wheel and the reel and a plan of parts of the planter. Fig. 3 is a plan of the sleeve-spindle, part of the reel, and devices for securing the sleeve-spindle on the planter-axle and other parts.

Referring to the drawings by letters, A represents a wheel journaled on a fixed axle, A', B a side bar, and C the rear bar, of an ordinary corn-planter, further description of which is unnecessary, as these parts may be of any ordinary construction.

D is a sleeve, one end of which is fitted loosely over the hub of the wheel A, and its other or outer end formed into a spindle, *d*. This sleeve-spindle is held in place on the wheel A by hook-bolts *e* and nuts *e'*. The hook-bolts engage the spokes of the wheel and pass through lugs E, which project from the inner end of the sleeve.

G is the reel, the hub G' of which is fitted loosely, so as to turn on the spindle *d*, and the bore in which is preferably enlarged toward its inner end, to fit a correspondingly-enlarged part, *d'*, of the spindle *d*.

H is a friction-spring disk placed over the spindle *d* between the hub G' and a nut, I, which is screwed onto the threaded end of the spindle *d*, and is held from unscrewing by a jam-nut, *i*. The concave side of the disk H is preferably toward the hub G'. A rubber disk or any other suitable friction-disk may be used instead of the disk H, if preferred.

J is a key for fixing the hub G' to the spindle *d* by passing through coincident holes in said parts.

K K are the reel-arms, forked at their outer ends, and hinged by bolts *k* at their inner ends each to a lug, *k'*, which projects from the hub G'. By loosening the nuts on the bolts *k* the reel-arms may be swung outwardly in planes parallel to the axis of the reel, as shown by dotted lines at Fig. 2, and by tightening said nuts the reel-arms are held securely in the positions shown by full lines in the drawings.

L is a hook or slotted plate fixed to one of the reel-arms for securing one end of the check-row wire by passing it through the slot therein until one of the buttons or tappets comes in contact with the plate L, and thereby holds the wire without tying.

An angle-plate, N, is attached to the bar C, and a plate, O, is pivoted to the plate N. A tubular guide, P, bell-shaped at each end, is fixed to the plate O, at one end thereof, and guide-pulleys Q R at its other end.

To lay the check-row wire across the field preliminary to planting, the key J is withdrawn, so as to permit the reel to turn on the spindle *d*. The check-row wire being on the reel, with one end thereof staked or anchored to the ground, as the planter is moved forward, the reel will be turned in a direction opposite to the direction of rotation of the wheel A, and thereby pay off the check-row wire as required, and at a tension such as desired, and is regulated by turning the nut I to increase or diminish the friction between the disk H and hub of the reel.

To take up and reel the wire after the planting is completed, or for any purpose, one end thereof is removed from the anchor, and after being passed through the guide P, over the pulley Q, and under the pulley R, is then secured to the plate L, as hereinbefore described.

The hub of the reel being now secured to the spindle d by the key J, the reel will rotate with the wheel A, and thereby wind the check-row wire on the reel as the planter is moved away from the stake or anchor at the distant end of said wire. The stake or anchor at the distant side of the field is pulled out of the ground by the movement of the planter before beginning to wind the check-row wire on the reel.

The key J may be dispensed with and any other desired locking device used in its stead; or by removing the disk H the nut I may be turned up tight enough to prevent the reel rotating on the spindle d.

The friction devices may be dispensed with in laying out the check-row wire; but I prefer to use them to regulate the tension of said wire.

The check-row wire may be removed from the reel in a coil or placed thereon by loosening the bolts k and turning the reel-arms outwardly, as hereinbefore described.

The sleeve D may be differently formed from what we have shown; in fact it need not be fitted over the wheel-hub, but may be simply a disk secured to the wheel and adapted to support the spindle d.

What we claim as new, and desire to secure by Letters Patent, is—

1. In a reel for laying a check-row wire, a sleeve, D, secured to the wheel A, and having its outer end formed into a spindle, d, with a conical part, d', substantially as described, the hub G', with reel arms, spring-disk H, and nuts I i, substantially as and for the purpose set forth.

2. In a reel for laying a check-row wire or cord, in combination, the spindle d, fixed to the wheel A, to rotate therewith, and hub G', provided with reel-arms, and friction spring or disk, to control the motion of the reel, substantially as and for the purpose specified.

3. A reel constructed substantially as described, attached to the wheel of a corn-planter for laying and for taking up the check-row wire or cord, said reel adapted to rotate in the same or in opposite directions from the direction of rotation of the wheels of the planter, the latter motion being controlled by friction devices and the former motion controlled by a lock connecting it with the wheel, substantially as and for the purpose specified.

4. The hub G', with its forked and hinged arms K, in combination with the wheel of a corn-planter, as and for the purpose specified.

5. In combination with the fixed axle A', wheel A, journaled thereon, and a spindle fixed to said wheel, a reel journaled on said spindle, and its rotation thereon controlled by friction devices, whereby the tension of the check-row wire or rope may be regulated in laying it, substantially as and for the purpose specified.

6. In combination with the fixed axle A', wheel A, journaled thereon, and a spindle fixed to said wheel, a reel the hub of which is journaled on said spindle, and its rotation thereon controlled by a friction-disk, H, and nut I, adapted to force the reel-hub endwise into frictional contact with a surface on said spindle, substantially as and for the purpose specified.

In testimony whereof we affix our signatures in presence of two witnesses.

JOHN C. DUPEE.
CHARLES P. HOUSUM.

Witnesses:
JOHN S. BIXBY,
SAMUEL J. JUDD.